R. W. GALLAGHER.
STATEMENT DELIVERY MECHANISM FOR METERS.
APPLICATION FILED NOV. 20, 1907.
12,892. Reissued Dec. 8, 1908.
2 SHEETS—SHEET 1.
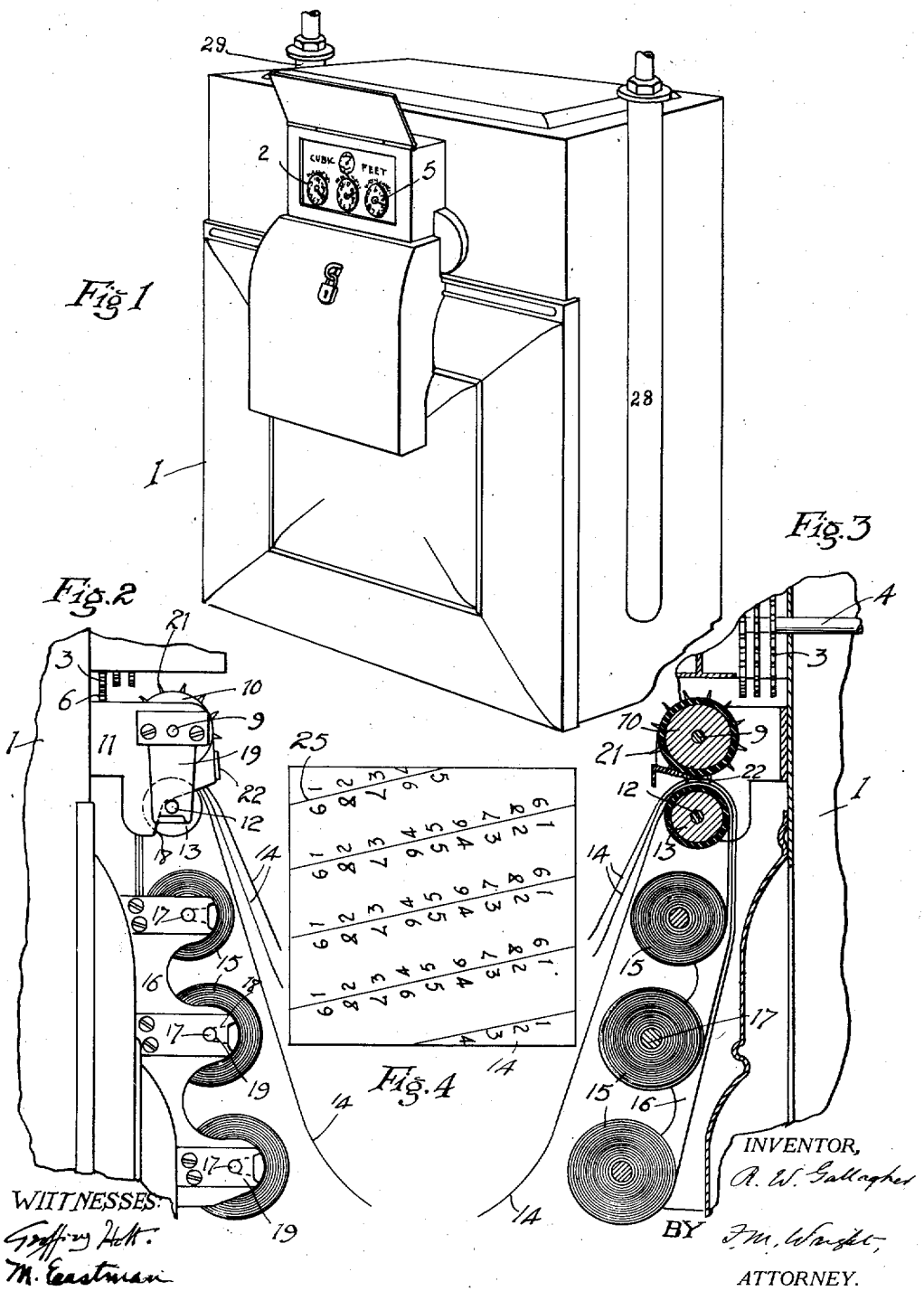

R. W. GALLAGHER.

STATEMENT DELIVERY MECHANISM FOR METERS.

APPLICATION FILED NOV. 20, 1907.

12,892. Reissued Dec. 8, 1908.

2 SHEETS—SHEET 2.

WITNESSES:

Geoffrey Holt.

M. Eastman

INVENTOR,

R. W. Gallagher

By F. M. Wright,

ATTORNEY.

UNITED STATES PATENT OFFICE.

RICHARD W. GALLAGHER, OF LOS ANGELES, CALIFORNIA.

STATEMENT-DELIVERY MECHANISM FOR METERS.

No. 12,892. Specification of Reissued Letters Patent. Reissued Dec. 8, 1908.

Original No. 825,451, dated July 10, 1906, Serial No. 271,147. Application for reissue filed November 20, 1907. Serial No. 403,102.

*To all whom it may concern:*

Be it known that I, RICHARD WILLIAM GALLAGHER, a citizen of the United States, residing at Los Angeles, in the county of Los Angeles and State of California, have invented certain new and useful Improvements in Statement-Delivery Mechanism for Meters, of which the following is a specification.

This invention relates to mechanism for delivering statements from automatic meters—such as gas-meters, electric meters, or the like—the object of the invention being to provide an apparatus by means of which statements may be obtained at any time in duplicate or triplicate or in greater numbers, if desired, of the amount of gas, electricity, or other fluid consumed.

An especial object of the invention is to provide a device of this character which can be readily attached to meters already in use with little expense.

Figure 5:
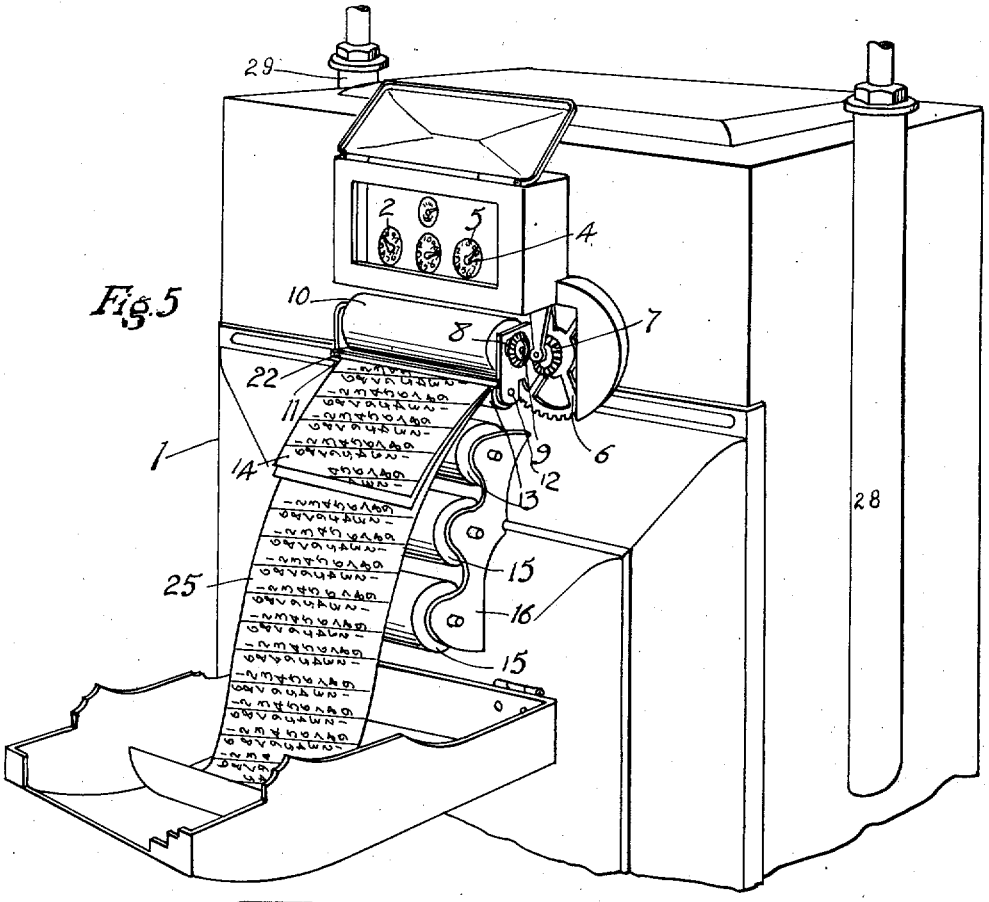
Figure 6:
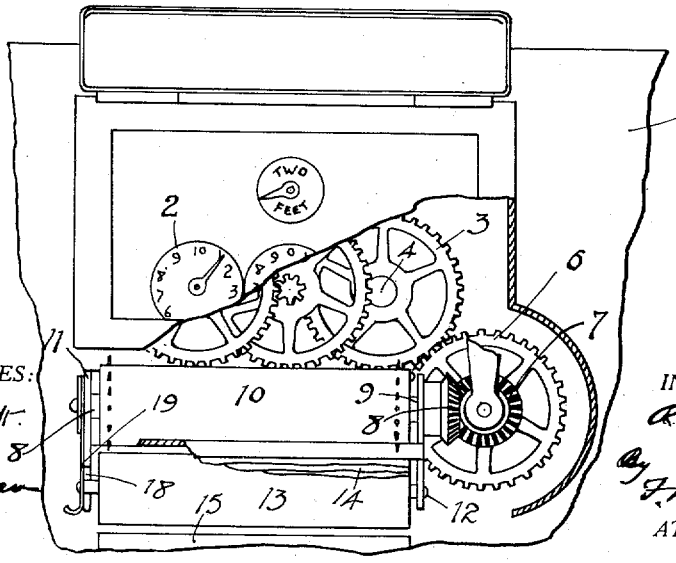

In the accompanying drawings, Figure 1 is a perspective view of a meter equipped with my improved statement-delivery mechanism. Fig. 2 is a side elevation of the statement-delivery mechanism. Fig. 3 is a vertical section of the statement-delivery mechanism. Fig. 4 is a front view of a portion of one of the record-strips. Fig. 5 is a perspective view of the upper portion of the meter, the cover of the delivery mechanism being open. Fig. 6 is a broken front elevation of the upper portion of the delivery mechanism.

Referring to the drawings, 1 represents a gas-meter connected to a supply pipe 28 and a delivery pipe 29 for the gas and having a series of indicating-dials 2 said dials being, in the usual manner, automatically rotated in correspondence with the amount of gas consumed by the passage of the gas down one of the pipes 27, 28, and up the other. Meshing with the gear wheel 3 on the shaft 4 of the hundreds-dial 5, is a gear-wheel 6, which carries on its shaft a bevel-gear 7, meshing with a bevel-gear 8 upon the shaft 9 of a feed roller 10, said shaft having bearings in a frame 11, secured to the face of the meter.

12 is another shaft having its bearings in said frame and carrying an idle feed roller 13, which revolves in close proximity to the roller 10. Between said rollers 10 and 13 pass statement-sheets 14, of which there are here shown three in number. These sheets are drawn from three supply rollers 15, having bearings in a frame 16, attached to the face of the gas-meter. The shafts 12 and 17 of the rollers 13 and 15 are easily removed, passing at one end into recesses 18 in the frames 11 and 16 and being held in said recesses by springs 19. All of these supply rolls and the feed rollers are normally protected from unauthorized access by means of a casing 30 secured by a suitable padlock 31 or other device. It will be seen that with this construction when the meter is in operation the feed roller 10 is revolved, thereby revolving also the roller 13, and in order to insure this movement of the two rollers in unison the feed roller 10 has pins 21, which enter the surface of the lower roller 13. By this means all the three statement-sheets are passed between said rollers in exact proportion to the amount of gas consumed. By removing the idle roller the sheets can at any time be adjusted.

The meter inspector will at regular intervals unlock the casing of the statement-delivery mechanism and will tear off the upper two sheets 14, a tearing-strip 22 of metal secured on the frame 11 being provided to enable this more accurately and conveniently to be done. The third sheet may be left in the casing for future inspection by a general inspector and will serve as a check or tally on the other sheets. These sheets may be ruled or marked in any desired manner which will conveniently represent the amount of gas consumed by the length of the sheet torn off. For instance, parallel diagonal lines 25 at suitable regular intervals may be ruled upon the sheets, each line representing the consumption of a thousand feet of gas and each line being divided into ten equal spaces to represent hundreds of feet of gas. Thus the end of the statement torn from the sheet of paper will by its position relative to the diagonal lines serve as a mark to show how many feet of gas have been consumed—namely, a thousand feet for every complete diagonal line thereon, and one hundred feet for each space in the two fractional end lines, and by adding these together and to the thousands for the number of diagonal lines on the paper the amount of gas consumed can be at once seen. In Fig. 4 is shown one of said pieces torn off to record the amount of gas consumed, having thereon three whole diagonal lines, each representing the consumption of one thousand feet of gas, and two fractional terminal lines, each of which in this case contains approximately five of the ten equal spaces into which each diagonal line is divided, said fractional lines thus together representing the consumption of one thousand feet, making a total of four thousand feet, represented by this record. If the paper had been torn off so as to cut one of the diagonal lines two spaces from its end, and the other diagonal lines six spaces from its end, then the record would represent a consumption of three thousand eight hundred feet of gas. Of the two sheets torn off the meter inspector will turn in one at the office and will retain one himself as a check, which may be used by him to compare with that taken at the next inspection of the meter.

While, as above explained, the line of severance of the statement from the sheet of the paper serves as an indicating mark to indicate the extent of advance of the paper and therefore the amount of the commodity consumed, yet my invention is not confined to this specific mode of making such necessary mark, the only essential requirement being that the paper be advanced correspondingly with the amount consumed, and that the paper thus advanced be marked in some way to indicate the extent of such advance at the time up to which payment is to be made.

I claim:—

In a device of the character described, means whereby a commodity may be continuously supplied, a meter automatically actuated by the movement of the commodity so supplied, means for preventing the actuation of said meter by hand, a roll of paper, means controlled by the meter for advancing the paper of said roll with its front end free and detachable, means for severing the front or free end of the paper, and means whereby the part so severed indicates the amount of said advance, substantially as described.

RICHARD W. GALLAGHER.

Witnesses:

FRANCIS M. WRIGHT,
NELLIE B. KEATING.